United States Patent
Demuth et al.

(10) Patent No.: US 7,890,475 B2
(45) Date of Patent: Feb. 15, 2011

(54) COMMON TRANSPORT LOGISTICS FOR SOFTWARE AND CONTENT

(75) Inventors: Michael Demuth, Rauenberg (DE); Uwe Fischer, Karlsruhe (DE)

(73) Assignee: SAP AG, Walldorf (DE)

( * ) Notice: Subject to any disclaimer, the term of this patent is extended or adjusted under 35 U.S.C. 154(b) by 1894 days.

(21) Appl. No.: 10/943,139

(22) Filed: Sep. 17, 2004

(65) Prior Publication Data

US 2006/0064686 A1  Mar. 23, 2006

(51) Int. Cl.
 *G06F 7/00* (2006.01)
 *G06F 17/00* (2006.01)
 *G06F 9/445* (2006.01)

(52) U.S. Cl. .................................. 707/690; 717/177
(58) Field of Classification Search .................. None
See application file for complete search history.

(56) References Cited

U.S. PATENT DOCUMENTS 5,675,802 A * 10/1997 Allen et al. ............... 717/103
5,970,490 A * 10/1999 Morgenstern ............. 707/10
7,200,681 B1 * 4/2007 Lewin et al. ............... 709/246

FOREIGN PATENT DOCUMENTS

WO  WO 01/03011  1/2001

OTHER PUBLICATIONS

Kamadolli et al., Cross-Media Information Server (WO 01/03011 A2)—from the IDS.*
Nentwich et. al., "Flexible Consistency Checking", Jan. 2003, ACM, pp. 28-63.*
Richard Monson-Haefel, Enterprise JavaBeans, 2$^{nd}$ Edition, Sep. 15, 2001, O'Reilly, pp. 1-140.*
Godambe et al., "Automated software patch distribution," *Xerox Disclosure Journal*, Xerox Corporation, Stanford, CT, 1995, 20(4): 361-362.

* cited by examiner

*Primary Examiner*—Michael J Yigdall
*Assistant Examiner*—Ben C Wang
(74) *Attorney, Agent, or Firm*—Schwegman, Lundberg & Woessner, P.A.

(57) ABSTRACT

Software and content used by the software are developed on a first computer system for use on a second computer system. Transferable forms of the developed software and content that may be used by the second computer system are created. The transferable form of the developed software is made available for transfer to the second computer system. The transferable form of the developed content is transferred to a content server that makes a transferable form of content used by software running on the second computer system available for receipt by the second computer system. The transferable form of the developed software from the first computer system and the transferable form of the content from the content server are received at the second computer system. The received software and content are translated into usable forms of the software and content that may be used by the second computer system.

26 Claims, 4 Drawing Sheets

COMMON TRANSPORT LOGISTICS FOR SOFTWARE AND CONTENT

TECHNICAL FIELD

This document relates to transferring and receiving software together with content used by the software.

BACKGROUND

Information technology ("IT") environments may include multiple computer systems on which software processes that use associated content are executed. The multiple computer systems may execute the same software processes or different software processes, depending on the functions, purposes, or environments of the multiple computer systems. In addition, the software processes executed on the multiple computer systems may use common content or different content, even if the software processes themselves are the same, depending on the context in which the software processes are executed or the functions, purposes, or environments of the multiple computer systems.

One or more of the multiple computer systems may be used for developing the software and content used by the other computer systems. The developed software and content are transferred separately and independently from the computer systems that develop the software and content to the computer systems that use the developed software and content. As a result, the software and the content are received separately at the other computer systems and then may be integrated separately into the other computer systems. Alternatively, only the software may be transferred between the computer systems, and the computer systems may recreate the associated content. All of the developed content may be sent to each of the other computer systems, regardless of whether the other computer systems use all of the developed content. Consistency between the software and content received by the other computer systems and the software and content already used by the other computer systems may not be checked before the received software and content are integrated into the already used software and content of the other computer systems.

SUMMARY

In one general aspect, software may be transmitted to computer systems that use the software together with content that is used by the software. Software is developed on a first computer system for use on a second computer system. Content is developed on the first computer system for use by the software. Transferable forms of the developed software and the developed content that may be used by the second computer system are created. The transferable form of the content represents a version of the developed content that is consistent with a version of the developed software represented by the transferable form of the software. The transferable form of the developed software is made available for transfer to the second computer system. The transferable form of the developed content is transferred to a content server that makes a transferable form of content used by software running on the second computer system available for receipt by the second computer system. The transferable form of the developed software from the first computer system and the transferable form of the content used by the developed software from the content server are received at the second computer system. The transferable form of the content represents content from the content server that is consistent with the version of the developed software represented by the transferable form of the software. The received software and content are translated into usable forms of the developed software and content that may be used by the second computer system.

Implementations may include one or more of the following features. For example, the transferable form of the developed software and the transferable form of the developed content may be created at substantially the same time. The received software may be translated into the usable form of the developed software before the received content is translated into the usable form of the developed content.

Consistency may be established at the content server between the content made accessible by the content server and the developed content transferred to the content server. Consistency may be established at the second computer system between the received software and previously received versions of the received software. Consistency may be established between the developed content and the developed software at the content server.

Receiving at the second computer system the transferable form of the developed content from the content server may include identifying content among the content made accessible by the content server and the developed content transferred to the content server that is relevant to the operation of the second computer system. Only the identified content may be received at the second computer system.

Creating a transferable form of the developed software may include identifying the developed software from software stored on the first computer system, and creating a transferable form of the identified software. Creating a transferable form of the developed content may include identifying the developed content from content stored on the first computer system, and creating a transferable form of the identified content.

Developing the software on the first computer system for use on the second computer system may include testing the software on the first computer system for use on the second computer system.

These general and specific aspects may be implemented using a system, a method, or a computer program, or any combination of systems, methods, and computer programs.

Other features will be apparent from the description and drawings, and from the claims.

DESCRIPTION OF DRAWINGS

Like reference symbols in the various drawings indicate like elements.

DETAILED DESCRIPTION

In a computer system where multiple client computer systems include software and content used by the software, the software and the content are transported between the multiple client computer systems together. More particularly, the software and the content are exported at substantially the same time from a client computer system on which the software and content are developed. The software and the content are subsequently imported at substantially the same time on a client computer system that uses the software and the content. A content server is used to establish consistency among the content used on the multiple client computer systems. The content server also makes only the content used by the software running on one of the multiple client computer systems available to the client computer system.

Transporting the software and the content together reduces software and content handling costs because the software and the content are handled at the same time in one process rather than in two separate processes. Transporting the software and the content together also prevents the client computer systems from having to recreate the content for testing or use. Using the content server to establish consistency among the content used on the multiple client computer systems improves performance of the multiple client computer systems by reducing duplicative, incorrect, or otherwise inconsistent content from the multiple client computer systems. Sending each of the multiple client computer systems only the content used by the client computer system reduces the amount of content that is transferred between the client computer systems, which may improve the performance of the client computer systems, the content server, or a network that connects the client computer systems and the content server.

Figure 1:
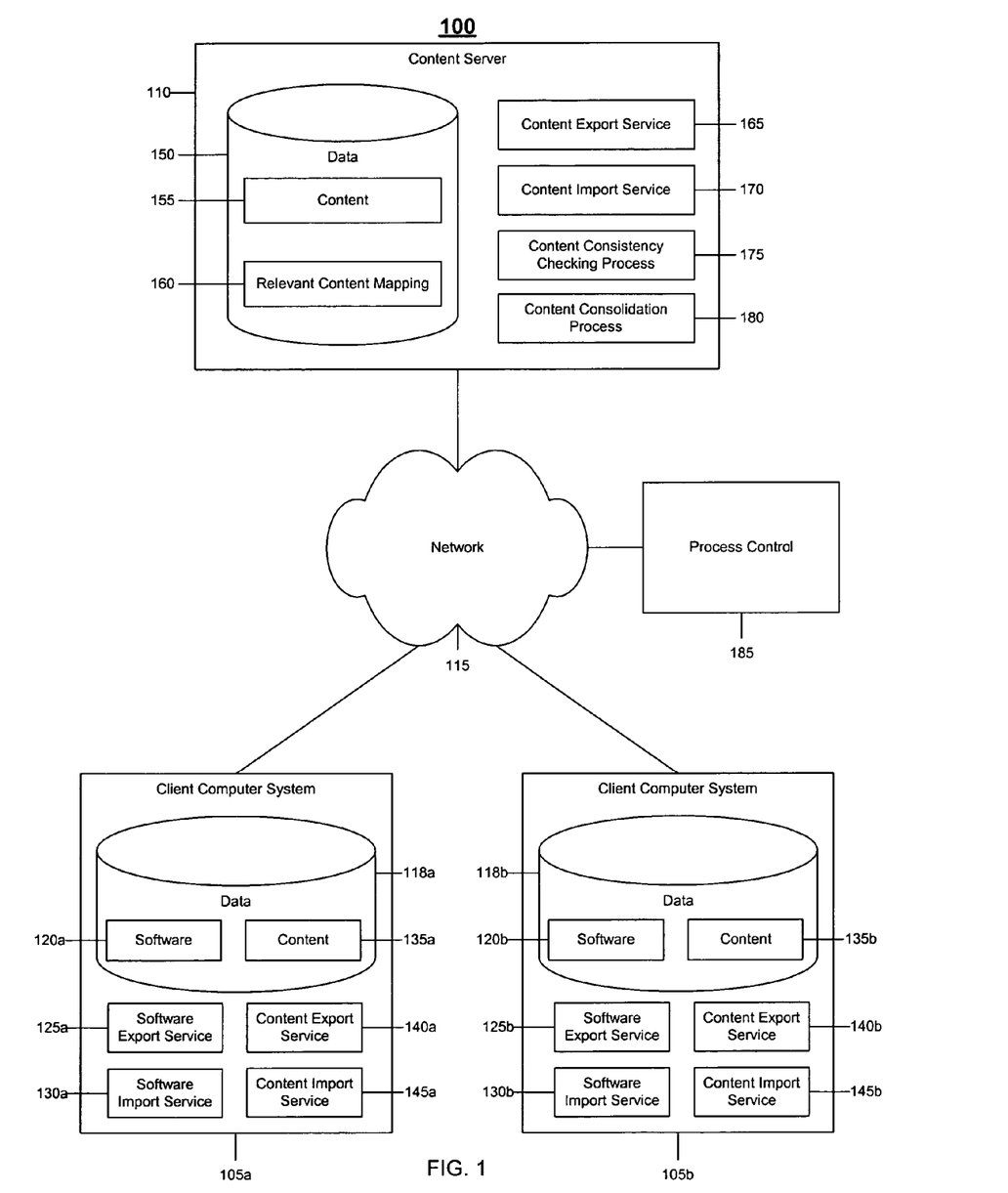
FIG. 1 is block diagram of a computer system in which software and content that is used by the software are transported together.

FIG. 1 is an illustration of a computer system 100 in which software executing on components of the computer system 100 is transported together with content used by the software. The computer system 100 includes client computer systems 105a and 105b that communicate with a content server 110 over a network 115. The client computer systems 105a and 105b include, respectively, data storage devices 118a and 118b, software 120a and 120b, software export services 125a and 125b, software import services 130a and 130b, content 135a and 135b, content export services 140a and 140b, and content import services 145a and 145b. The content server 110 includes a data storage device 150 that includes content 155 and a relevant content mapping 160. The content server 110 also includes a content export service 165, a content import service 170, a content consistency checking service 175 and a content consolidation service 180. A process control 185 controls aspects of the operation of the client computer systems 105a and 105b and the content server 110.

The client computer systems 105a and 105b execute software that uses content. The computer system 100 may include any number of client computer systems, and two is used for illustrative purposes only. The software executed by the client computer systems 105a and 105b are represented by the software 120a and 120b, respectively, and the content used by the software 120a and 120b is represented by the content 125a and 125b respectively. The client computer systems 105a and 105b may have different purposes. For example, the client computer system 105a may develop software and content, and the client computer system 105b may use the developed or tested software and content in an operative or productive scenario. Other client computer systems may be used for developing only software, for developing only content, or for testing the developed software and content. Developing software or content may include creating new software or content or modifying existing software or content. The client computer systems 105a and 105b also may operate in different environments. For example, the client computer system 105a may operate in a sales environment, and the client computer system 105b may operate in a production environment. Typically, the client computer systems 105a and 105b execute common software, because of the reduced total cost of ownership of the common software and because e of the wide applicability of the common software to the client computer systems 105a and 105b. However, the content used by the software may vary between the client computer systems 105a and 105b, even when common software is used. The different sets of content used by the client computer systems 105a and 105b may reflect the different purposes or environments of the client computer systems 105a and 105b.

The content server 110 manages content that is used by the client computer systems 105a and 105b. More particularly, the content server 110 makes the content used by the software running on the client computer systems 105a and 105b available for receipt by each of the client computer systems 105a and 105b. The content server 110 ensures consistency of the content used by the client computer systems 105a and 105b. The content server 110 also consolidates the content used by the client computer systems 105a and 105b to make only the content needed by the software executing on one of the client computer systems 105a and 105b available for receipt by the client computer system 105a or 105b. The content made available for each of the client computer systems 105a and 105b by the content server 110 may depend on the functions, purposes, or environments of the client computer systems 105a and 105b.

The software 120a and 120b are stored in the data storage devices 118a and 118b of the client computer systems 105a and 105b, respectively. The software 120a and 120b represents software that is executed on the client computer systems 105a and 105b. The software 120a and 120b also may represent software that is developed for execution on other client computer systems. For example, the software 120a may include software that is developed on the client computer system 105a for execution on the client computer system 105b. The software 120a and 120b may be code-based software, in which case the software 120a and 120b may be specified in any language capable of being executed on the client computer systems 105a and 105b, respectively. The software 120a and 120b may include compiled or uncompiled versions of the code that represents the executed software. The software 120a and 120b also may be declaration-based software, in which flags, preferences, and parameters within a general software framework are set to cause the general software framework to perform a specific function. In such a case, the software 120a and 120b may include declarations of the settings for the flags, preferences, and parameters of the general software framework, as well as the general software framework itself.

The software export services 125a and 125b enable the software 120a and 120b to be exported from the client computer systems 105a and 105b, respectively. Exporting the software 120a and 120b may include creating a form of the software 120a and 120b that may be transferred from the client computer systems 105a and 105b. For example, the client computer system 105a may use the software export service 125a to export the software 120a such that the software 120a may be transferred to the client computer system 105b. In one implementation, the software 120a and 120b may be consolidated prior to being exported such that only the pieces of the software 120a and 120b that were developed on the corresponding client computer systems 105a and 105b are exported with the software export services 125a and 125b. The transferable form of the software 120a or 120b may be a text file formatted according to a markup language, such as extensible mark-up language (XML). The XML file may be produced through execution of a transformation process on the software 120a or 120b, such as an extensible stylesheet language transformation (XSLT) process.

The software import services 130a and 130b enable software to be imported into the client computer systems 105a and 105b, respectively. More particularly, the software import services 130a and 130b enable the transferable forms of the software 120a and 120b produced by the software export services 125a and 125b to be converted into a usable (i.e., executable) form. For example, the client computer system 105b may use the software import service 130b to create a usable form of the software 120a exported from the client computer system 105a with the software export service 125a. The software import services 130a and 130b provide a transformation process that may be an inverse of the transformation process provided by the software export services 125a and 125b. Therefore, converting the transferable form of the software into the usable form may include executing a process that is the inverse of the transformation process used to create the transferable form.

The content 155 is stored in the data storage device 150 of the content server 110. The content 135a and 135b similarly are stored in the data storage devices 118a and 118b of the client computer systems 105a and 105b, respectively. Software applications and processes operating on the content server 110 access and use the content 155. The content 135a and 135b represent content that is accessed and used by the software 120a and 120b that is executed on the client computer systems 105a and 105b, respectively. The content 135a and 135b also may represent content that is developed for use on other client computer systems. For example, the content 135a may include content that is developed on the client computer system 105a for use on the client computer system 105b. The client computer systems 105a and 105b may transfer locally developed content to the content server 110 for storage in the content 155. The content 155 also may include content required by the client computer systems 105a and 105b for proper receipt of content from the content server 110. Because the content server 110 distributes the content 155 to the client computer systems 105a and 105b, the content 135a and 135b each include a portion of the content 155.

The content 135a, 135b, and 155b are any pieces of information on the client computer systems 105a and 105b and the content server 110, respectively, that are not software. For example, the content 135a, 135b, and 155b may include one or more business objects, which are also known as master data objects, or transactional data objects. Business objects refer to data that are created, revised or deleted by software applications or processes running on the client computer systems 105a and 105b and the content server 110. Often, a business object refers to a principal entity used in the software applications or processes. Examples of business objects include, but are not limited to, a product object, an employee object, a customer object, or a business partner object. Transactional data objects may include, reference, or use one or more business objects. Examples of transactional data objects include, but are not limited to, sales order objects. Each business or transactional data object in the content 135a, 135b, and 155 is a collection of data attribute values. A business or transactional data object may be stored as a row in a relational database table, an object instance in an object-oriented database, data in an XML file, or a record in a data file.

The content export services 140a and 140b enable the content 135a and 135b to be exported from the client computer systems 105a and 105b, respectively. The content export services 140a and 140b may be used at substantially the same time as the corresponding software export services 125a and 125b. Exporting the content 135a and 135b may include creating a form of the content 135a and 135b that may be transferred from the client computer systems 105a and 105b to the content server 110. For example, the client computer system 105a may use the content export service 140a to export the content 135a such that some or all of the content 135a may be transferred to the client computer system 105b through the content server 110. In one implementation, only the content that was accessed or modified while developing software on the client computer systems 105a and 105b may be exported using the content export services 140a and 140b. Similarly, the content export service 165 is used to create a form of some or all of the content 155 that is used on one of the client computer systems 105a and 105b for transfer to the client computer system 105a or 105b. Like the software export services 125a and 125b, the transferable forms of the content 135a, 135b, and 155 produced by the content export services 140a, 140b, and 155 may be text files, such as XML files, that are produced through execution of a transformation process on the content. In one implementation, the transferable forms of software and content created by one of the client computer systems 105a or 105b may be part of a single transferable form, such as a single file. For example, a transferable form of software created by the software export service 125a and a transferable form of content created by the content export service 140a may be combined into a single transferable form.

The content import services 145a, 145b, and 170 enable content to be imported into the client computer system 105a, the client computer system 105b, and the content server 110, respectively. More particularly, the content import services 145a and 145b enable the transferable form of the content 155 produced by the content export services 165 to be converted into a form that may be used on the client computer systems 105a and 105b. For example, the client computer system 105b may use the content import service 145b to create a usable form of the content 155 exported from the content server 110 with the content export service 165. The content import services 145a and 145b may be used after the corresponding software import services 130a and 130b such that content is imported after corresponding software. Importing content after corresponding software ensures that the content is consistent with the latest version of software that has been imported. The content import service 170 enables the transferable forms of the content 135a and 135b produced by the content export services 140a and 140b to be converted into a form that may be integrated into other content stored on the content server 110. The transformation process provided by the content import services 145a, 145b, and 170 may be an inverse of the transformation process provided by the content export services 140a, 140b, and 165. Therefore, converting the transferable forms of the content 145a, 145b, and 155 into the usable forms may include executing a process that is the inverse of the transformation process used to create the transferable form.

The content consistency checking service 175 establishes consistency between content that is received from one of the client computer systems 105a or 105b and the content 155 stored on the content server 110. The content received from one of the client computer systems 105a or 105b may be content that is developed on the client computer system 105a or 105b. The developed content may be new content or existing content that has been modified while developing corresponding software. The content consistency checking service 175 verifies that the new or modified content does not conflict with the content 155 already stored on the content server 110 and with the corresponding software. If conflicts are found, the content consistency checking service 175 may resolve the conflict such that the amount of duplicative, incorrect, or otherwise inconsistent content on the content server 110 is reduced. The conflict may be resolved by replacing older content with newer content. For example, content that is newly imported or manually edited on the content server 110 may replace conflicting content. The conflict also may be resolved by merging the conflicting content into a single piece of content. The content consistency checking service 175 also may establish consistency between sets of content received from the client computer systems 105a and 105b before the sets of content are integrated into the content server 110. In one implementation, the content consistency checking service 175 may form part of the content importing service 170. In another implementation, the content import service 170 may require operation of the content consistency checking service 175 before importing received content into the content server 110.

The content consolidation service 180 consolidates the content 155 stored on the content server 110. Consolidating the content 155 includes identifying portions of the content 155 that are used by each of the client computer systems 105a and 105b. Indications of the portions of the content 155 that are used by each of the client computer systems 105a and 105b are stored in the relevant content mapping 160, which is a mapping of client computer systems to content used by the client computer systems. The content consolidation service 180 may be executed each time content is imported into the content server 110 after consistency of the imported content with the content 155 has been established. In such a case, the content consolidation service 180 may only consolidate the recently imported content. The imported content may include new and modified content. Consolidating the modified content may include updating entries in the relevant content mapping 160 to refer to the modified content. Consolidating the new content may include identifying client computer systems that require the new content and updating the relevant content mapping 160 to indicate that the identified client computer systems require the new content. The client computer systems that require the new content may be identified as a result of requests from the client computer systems for the new content. A client computer system may request the new content through explicit reference to the new content or through specification of rules or criteria that identify content that is required by the client computer system.

When the content 155 is to be exported for transfer to a client computer system, the relevant content mapping 160 may be used to identify the portions of the content 155 that are used on the client computer system, and only those identified portions of the content 155 may be exported by the content export service 165. Consolidating the content 155 prevents content that is not used by a client computer system 105a or 105b from being transferred to the client computer system, which may improve the performance of the client computer system 105a or 105b and the network over which the content is transferred.

The computer system 100 also may include a process control 185 that controls the flow of software and content between the client computer systems 105a and 105b and the content server 110 during development, testing, and distribution of the software and content. The process control 185 may determine when software and content are imported into and exported from the client computer systems 105a and 105b and the content server 110. Therefore, the process control 185 may ensure that software and associated content are imported and exported at substantially the same time. The process control 185 may be a separate system, as illustrated in FIG. 1, or may be integrated into one or more of the client computer systems 105a or 105b or the content server 110. In implementations where the process control 185 is integrated into the content server 110, the process control 185 may control the activities of the content server 110, such as consistency checking and content consolidation. The process control 185 also may monitor the flow of the software and content between the client computer systems 105a and 105b and the content server 110 to verify that the software and content are transported without error.

The client computer systems 105a and 105b and the content server 110 may be arranged to operate within or in concert with one or more other systems, such as the network 115, which may represent, for example, one or more local area networks (LANs) and/or one or more wide area networks (WANs). The client computer systems 105a and 105b may be general-purpose computers that are capable of executing software that uses content and of receiving content from the content server 110 (e.g., a desktop personal computer, a workstation, or a laptop computer running an application program). Alternatively, the client computer systems 105a and 105b may be special-purpose computers (e.g., a device specifically programmed to execute software that uses content and to receive content from the content server 110). The content server 110 also may include one or more general-purpose computers or one or more special-purpose computers that are capable of distributing content to the client computer systems 105a and 105b. The client computer systems 105a and 105b and the content server 110 may be capable of communicating synchronously or asynchronously through wired or wireless communications pathways.

Figure 2:
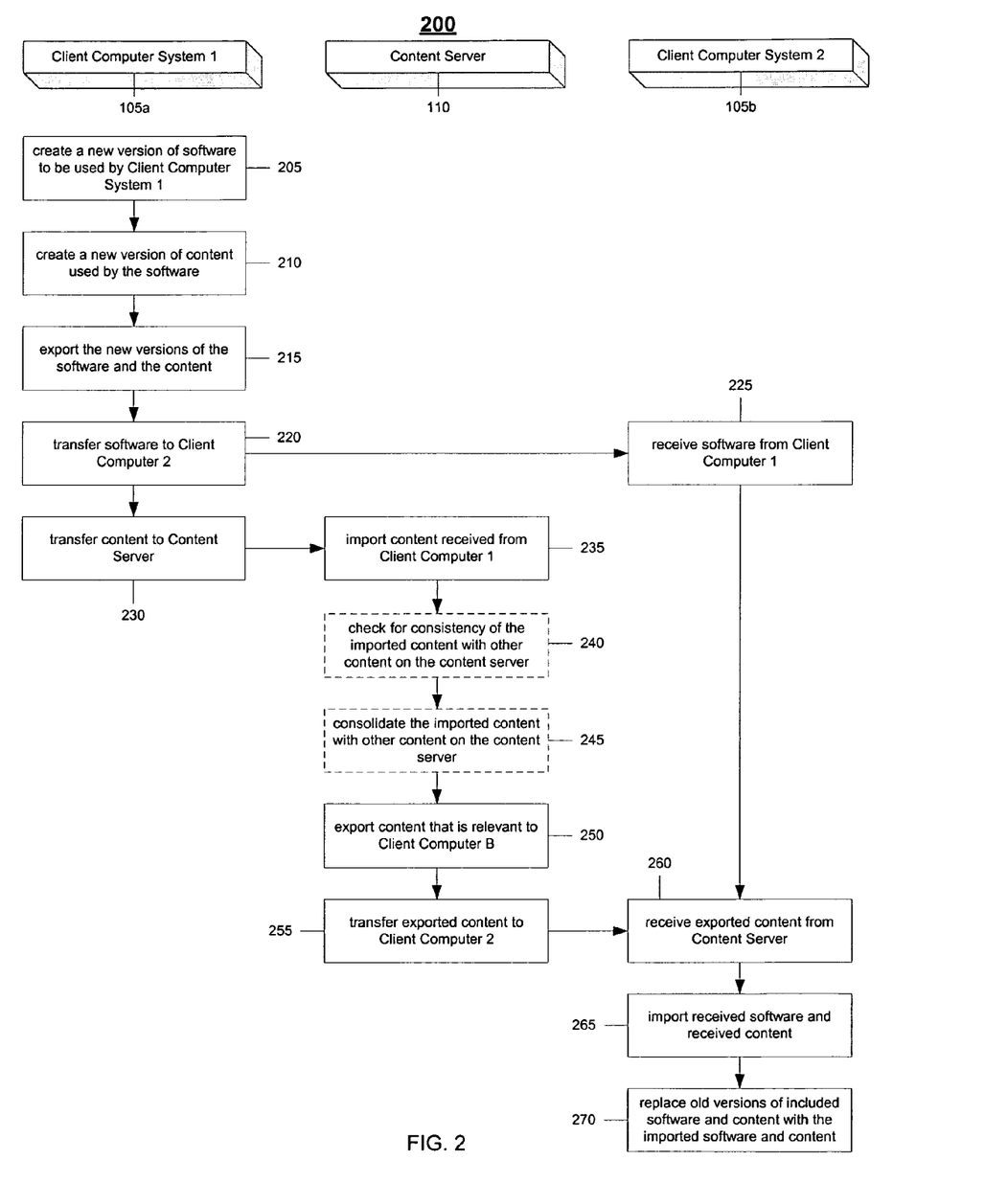
FIG. 2 is a flow chart of a process for transporting software and content that is used by the software together.

FIG. 2 is a flow chart of a process 200 for transporting software and content used by the software together. The process 200 involves client computer systems 105a and 105b and a content server 110. The software and content are developed on the client computer system 105a and are used on the client computer system 105b. The software is transported to the client computer system 105b directly from the client computer system 105a, and the content is transferred to the client computer system 105b through the content server 110. The software and content are exported from the client computer system 105a or imported into the client computer system 105b at substantially the same time.

The process 200 begins when the client computer system 105a creates a new version of software to be used by the client computer system 105b (step 205). The client computer system 105a also creates a new version of content used by the software (step 210). Alternatively, the client computer system 105a may create a new version of only one of the software and the content used by the software. The client computer system 105a develops the software and content for use by other client computer systems, such as the client computer system 105b. Creating the new versions of the software and content may include creating new software and content, modifying existing software and content, or deleting existing software and content. The new versions of the software and content may be developed, for example, in response to a request for additional functionality in the software from one of the other client computer systems, to fix an error in the software or the content, or to accommodate business requirements.

The client computer system 105a exports the new versions of the software and the content at substantially the same time (step 215). In other words, the client computer system 105a exports the new versions of the software and the content such that the software and the content are not modified before both of the software and the content are individually exported. Because the software and the content are exported at substantially the same time, the transferable forms of the software and the content represent a consistent snapshot of the software and the content that may be used by the software at the time of export.

The client computer system 105a may export the software using a software export service, such as the software export service 125a of FIG. 1. The client computer system 105a may export the content using a content export service, such as the content export service 140a of FIG. 1. As a result, transferable forms of the software and content, such as XML files specifying the software and the content, are produced for transport to the client computer system 105b. In implementations where separate processes or services are used to export the software and the content, the software and the content may be exported at substantially the same time by executing the processes in parallel or sequentially with little or no time between the processes.

Only portions of locally stored software and content that were developed on the client computer system 105a may be exported. The new versions of the software and the content may be exported in response to an indication received from a user of the client computer system 105a that developed the software and the content. For example, the user may indicate that development of the software and the content is complete and that the software and the content should be exported. Alternatively or additionally, the new versions of the software and the content may be exported in response to a request from the client computer system 105b for the new versions of the software and the content.

The client computer system 105a transfers the transferable form of the software to the client computer system 105b (step 220), and the client computer system 105b receives the software (step 225). The software may be transferred over a network that connects the client computer system 105a and 105b and the content server 110, such as the network 115 of FIG. 1.

In addition, the client computer system 105a transfers the transferable form of the content to the content server 110 over the network (step 230), and the content server 110 receives the content. The content server 110 then imports the transferable form of the content that was received from the client computer system 105a (step 235). The content server 110 may import the content using a content import service, such as the content import service 170 of FIG. 1. As a result, the transferable form of the content is converted into actual content, such as one or more database tables or records, that was developed on the client computer system 105a.

The content server 110 may check for consistency of the imported content with other content on the content server 110 if consistency of the imported content with the other content is not established when the content is imported (step 240). The content server 110 may check for consistency of the content using a content consistency checking service, such as the content consistency checking service 175 of FIG. 1. The content consistency checking service identifies and resolves inconsistencies between the imported content and the other content on the content server such that the amount of duplicative, incorrect or otherwise inconsistent content on the content server 110 is reduced.

The content server 110 also may consolidate the imported content with other content on the content server (step 245). The content server may consolidate the imported content using a content consolidation service, such as the content consolidation service 180. When consolidating the imported content, the content server 110 identifies client computer systems, such as the client computer system 105b, that include software that use the imported content. Indications of the content used by the client computer systems, such as the relevant content mapping 160 of FIG. 1, may be updated to include the imported content.

The content server 110 exports content that is used by the client computer system 105b (step 250). The content server 110 may export the content using a content export service, such as the content export service 165 of FIG. 1. The content that is exported may be identified from the indications of used content that are maintained by the content server 110, such as the relevant content mapping 160 of FIG. 1. The exported content may include some or all of the content received from the client computer system 105a. Exporting the content that is used by the client computer system 105b produces a form of the used content, such as an XML file, that may be easily transferred to the client computer system 105b.

The content server 110 transfers the transferable form of the content to the client computer system 105b (step 255), and the client computer system 105b receives the content (step 260). The client computer system 105b then imports the content received from the content server 110 and the software received from the client computer system 105a (step 265). More particularly, the client computer system 105a imports the received content after importing the received software such that existing software on the second computer system 105b does not use the newly received content, which may cause errors on the second computer system 105b. Therefore, the received software and content are imported at substantially the same time to ensure consistency and interoperability between the software and the content on the second computer system 105b. Importing the received software and content creates usable forms of the software and content. The received software and content may be imported in response to a request from a user of the client computer system 105b for new versions of the software and content.

The client computer system 105b may import the content using a content import service, such as the content import service 145b of FIG. 1. The client computer system 105b may import the software using a software import service, such as the software import service 130b of FIG. 1. In implementations where separate processes or services are used to import the software and the content, the software and the content may be imported at substantially the same time by executing the processes in parallel or sequentially with little or no time between the processes.

Prior to using the software and the content, the client computer system 105b may replace old versions of the software and the content with the recently imported software and content (step 270). Old versions of the software and content are replaced with new versions such that the client computer system 105b does not include duplicative or inconsistent software or content.

In some implementations of the process 200, the client computer system 105a may transfer the transferable form of the software to the content server 110 instead of or in addition to the client computer system 105b. In such an implementation, the content server 110 may check for consistency between the developed software and the developed content prior to transmission to the client computer system 105b. The content server 110 may transmit both the transferable form of the software and the transferable form of the content to the client computer system 105b, which imports the received software and content at substantially the same time.

Figure 3:
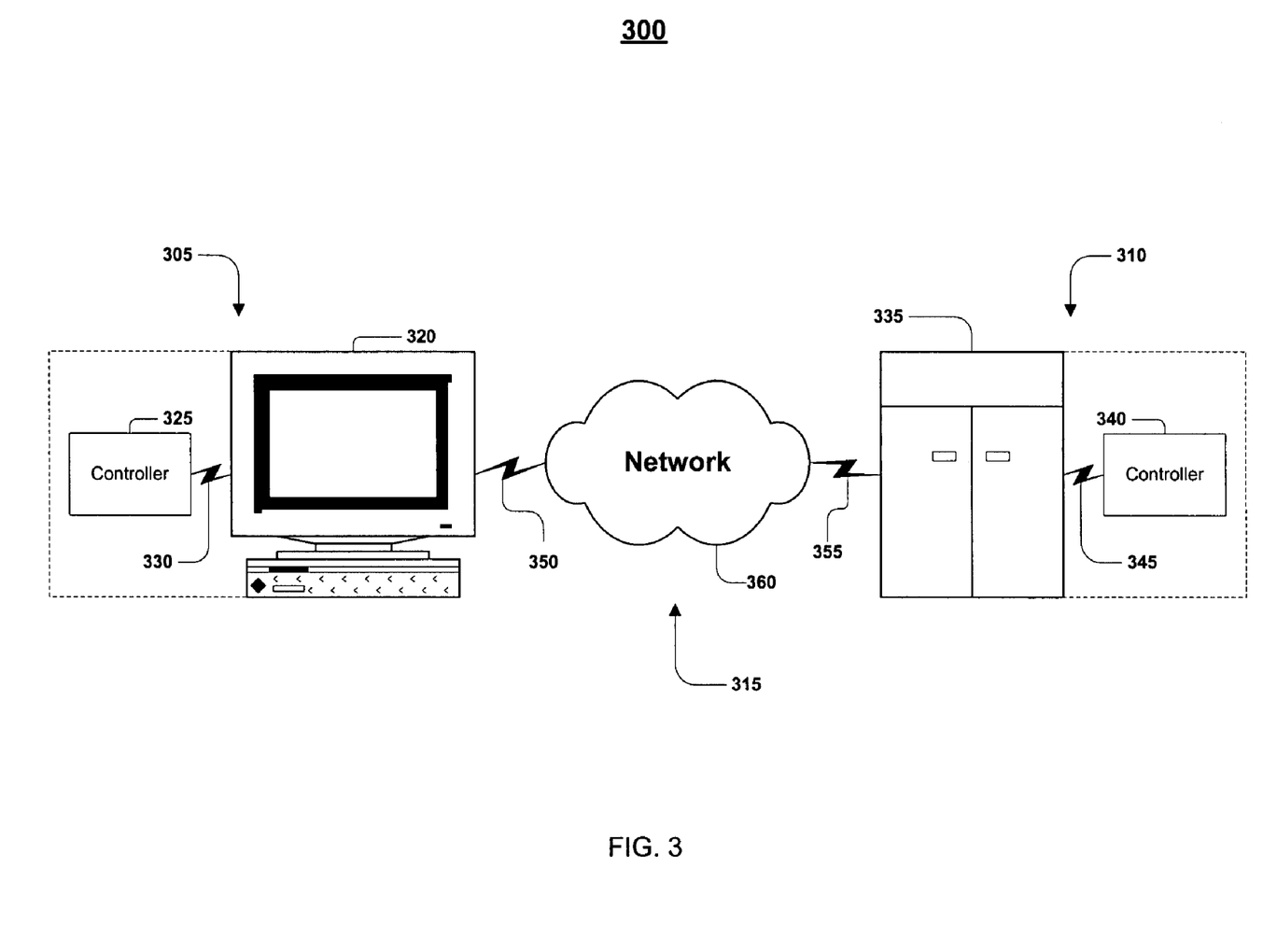
FIG. 3 is a block diagram of a communications system in which multiple client computer systems run software processes that use associated content.
Figure 4:
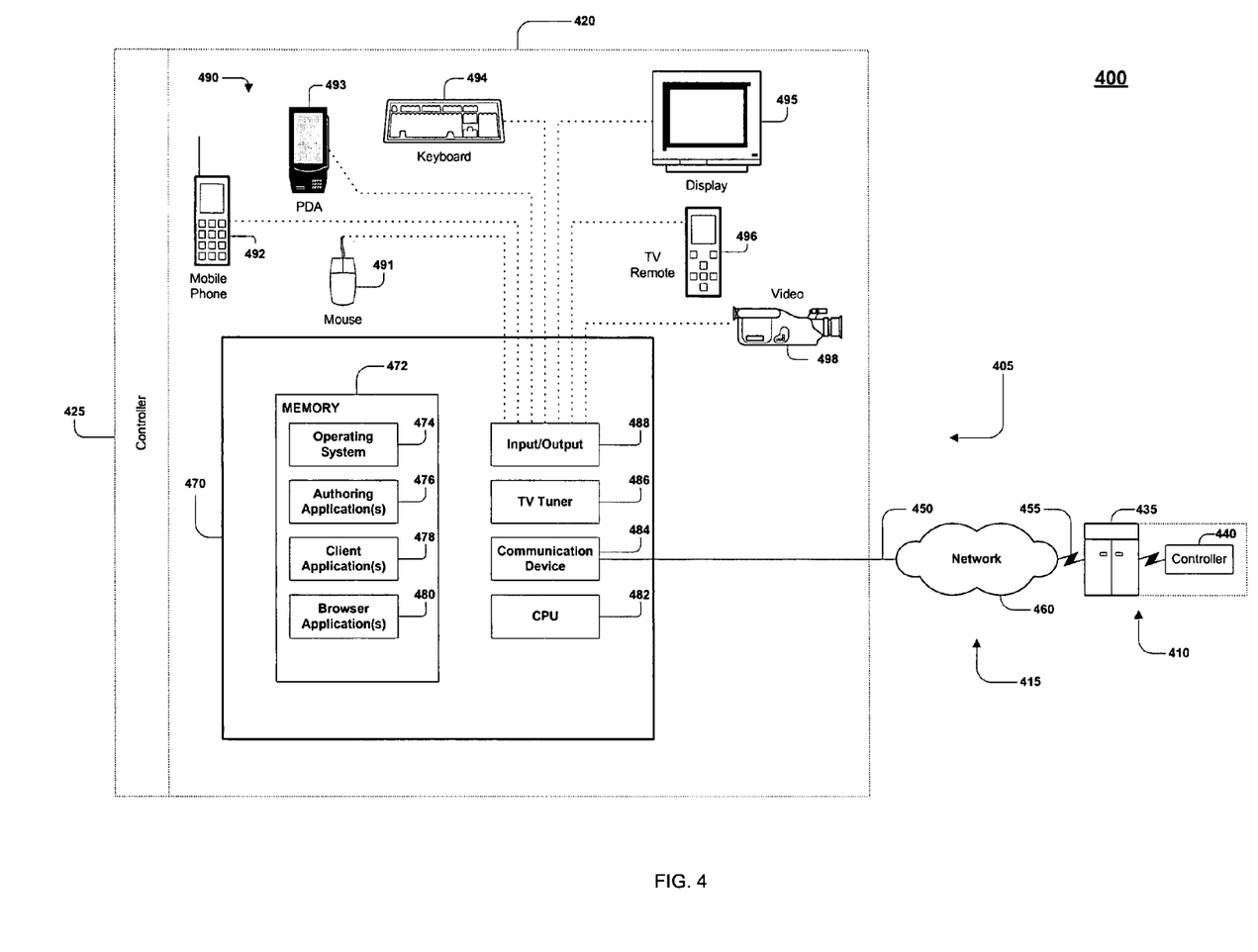
FIG. 4 is an expansion of the block diagram of FIG. 3.

For illustrative purposes, FIGS. 3 and 4 describe a communications system for implementing techniques for transporting software and content used by the software together. For brevity, several elements in the figures described below are represented as monolithic entities. However, as would be understood by one skilled in the art, these elements each may include numerous interconnected computers and components designed to perform a set of specified operations and/or dedicated to a particular geographical region.

Referring to FIG. 3, a communications system 300 is capable of delivering and exchanging data between a client system 305 and a host system 310 through a communications link 315. The client 305 may be, for example, one of the client computer systems 105a and 105b of FIG. 1, and the host system 110 may be, for example, the content server 110 of FIG. 1. The communications link 315 may be, for example, the network 115 of FIG. 1.

The client system 305 typically includes one or more client devices 320 and/or client controllers 325, and the host system 310 typically includes one or more host devices 335 and/or host controllers 340. For example, the client system 305 or the host system 310 may include one or more general-purpose computers (e.g., personal computers), one or more special-purpose computers (e.g., devices specifically programmed to communicate with each other and/or the client system 305 or the host system 310), or a combination of one or more general-purpose computers and one or more special-purpose computers. The client system 305 and the host system 310 may be arranged to operate within or in concert with one or more other systems, such as, for example, one or more LANs ("Local Area Networks") and/or one or more WANs ("Wide Area Networks").

The client device 320 (or the host device 335) is generally capable of executing instructions under the command of a client controller 325 (or a host controller 340). The client device 320 (or the host device 335) is connected to the client controller 325 (or the host controller 340) by a wired or wireless data pathway 330 or 345 capable of delivering data.

The client device 320, the client controller 325, the host device 335, and the host controller 340 each typically include one or more hardware components and/or software components. An example of a client device 320 or a host device 335 is a general-purpose computer (e.g., a personal computer) capable of responding to and executing instructions in a defined manner. Other examples include a special-purpose computer, a workstation, a server, a device, a component, other physical or virtual equipment or some combination thereof capable of responding to and executing instructions.

An example of client controller 325 or a host controller 340 is a software application loaded on the client device 320 or the host device 335 for commanding and directing communications enabled by the client device 320 or the host device 335. Other examples include a program, a piece of code, an instruction, a device, a computer, a computer system, or a combination thereof, for independently or collectively instructing the client device 320 or the host device 335 to interact and operate as described. The client controller 325 and the host controller 340 may be embodied permanently or temporarily in any type of machine, component, physical or virtual equipment, storage medium, or propagated signal capable of providing instructions to the client device 320 or the host device 335.

The communications link 315 typically includes a delivery network 360 making a direct or indirect communication between the client system 305 and the host system 310, irrespective of physical separation. Examples of a delivery network 360 include the Internet, the World Wide Web, WANs, LANs, analog or digital wired and wireless telephone networks (e.g., PSTN, ISDN, and xDSL), radio, television, cable, satellite, and/or any other delivery mechanism for carrying data. The communications link 315 may include communication pathways 350, 355 that enable communications through the one or more delivery networks 360 described above. Each of the communication pathways 350, 355 may include, for example, a wired, wireless, cable or satellite communication pathway.

FIG. 4 illustrates a communication system 400 including a client system 405 communicating with a host system 410 through a communications link 415. Client system 405 typically includes one or more client devices 420 and one or more client controllers 425 for controlling the client devices 420. Host system 410 typically includes one or more host devices 435 and one or more host controllers 440 for controlling the host devices 435. The communications link 415 may include communication pathways 450, 455 enabling communications through the one or more delivery networks 460.

Examples of each element within the communication system of FIG. 4 are broadly described above with respect to FIG. 3. In particular, the host system 410 and the communications link 415 typically have attributes comparable to those described with respect to the host system 310 and the communications link 315 of FIG. 3, respectively. Likewise, the client system 405 of FIG. 4 typically has attributes comparable to, and may illustrate one possible embodiment of, the client system 305 of FIG. 3.

The client device 420 typically includes a general purpose computer 470 having an internal or external storage 472 for storing data and programs such as an operating system 474 (e.g., DOS, Windows®, Windows® 95, Windows® 98, Windows® 2000, Windows® NT, Windows® Millennium Edition, Windows® XP, OS/4, Macintosh® OS, and Linux®) and one or more application programs. Examples of application programs include authoring applications 476 (e.g., word processing, database programs, spreadsheet programs, presentation programs, and graphics programs) capable of generating documents or other electronic content; client applications 478 capable of communication with other computer users, accessing various computer resources, and viewing, creating, or otherwise manipulating electronic content; and browser applications 480 (e.g., Netscape's Navigator® and Microsoft's Internet Explorer®) capable of rendering standard Internet content.

The general-purpose computer 470 also includes a central processing unit 482 (CPU) for executing instructions in response to commands from the client controller 425. In one implementation, the client controller 425 includes one or more of the application programs installed on the internal or external storage 472 of the general-purpose computer 470. In another implementation, the client controller 425 includes application programs externally stored in and executed by one or more device(s) external to the general-purpose computer 470.

The general-purpose computer typically includes a communication device 484 for sending and receiving data. One example of the communication device 484 is a modem. Other examples include a transceiver, a set-top box, a communication card, a satellite dish, an antenna, or another network adapter capable of transmitting and receiving data over the communications link 415 through a wired or wireless data pathway 450. The general-purpose computer 470 also may include a TV ("television") tuner 486 for receiving television programming in the form of broadcast, satellite, and/or cable TV signals. As a result, the client device 420 can selectively and/or simultaneously display network content received by communications device 484 and television programming content received by the TV tuner 486.

The general-purpose computer 470 typically includes an input/output interface 488 to enable a wired or wireless connection to various peripheral devices 490. Examples of peripheral devices 490 include, but are not limited to, a mouse 491, a mobile phone 492, a personal digital assistant 493 (PDA), a keyboard 494, a display monitor 495 with or without a touch screen input, and/or a TV remote control 496 for receiving information from and rendering information to subscribers. Other examples may include voice recognition and synthesis devices.

Although FIG. 4 illustrates devices such as the mobile telephone 492, the PDA 493, and the TV remote control 496 as being peripheral with respect to the general-purpose computer 470, in another implementation, such devices may themselves include the functionality of the general-purpose computer 470 and operate as the client device 420. For example, the mobile phone 492 or the PDA 493 may include computing and networking capabilities, and may function as a client device 420 by accessing the delivery network 460 and communicating with the host system 410. Furthermore, the client system 405 may include one, some, all, or none of the components and devices described above.

The described systems, methods, and techniques may be implemented in digital electronic circuitry, computer hardware, firmware, software, or in combinations of these elements. Apparatus embodying these techniques may include appropriate input and output devices, a computer processor, and a computer program product tangibly embodied in a machine-readable storage device for execution by a programmable processor. A process embodying these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made without departing from the spirit and scope of the claims. For example, advantageous results still could be achieved if steps of the disclosed techniques were performed in a different order and/or if components in the disclosed systems were combined in a different manner and/or replaced or supplemented by other components. Accordingly, other implementations are within the scope of the following claims.

What is claimed is:

1. A method of transmitting software with content that is used by the software, the method comprising:
    developing software on a first computer system for use on a second computer system, the second computer system being a client computer system;
    developing content on the first computer system for use by the software;
    creating a transferable form of the developed software that may be used by the second computer system;
    creating a transferable form of the developed content that may be used by the second computer system, the transferable form of the content representing a version of the developed content that is consistent with a version of the developed software represented by the transferable form of the software;
    making the transferable form of the developed software available for transfer to the second computer system;
    transferring the transferable form of the developed content to a content server that makes a transferable form of content used by software running on the second computer system available for receipt by the second computer system, wherein a content consistency checking service verifies that the transferable form of the content does not conflict with content already stored on the content server and with at least one of software running on the second computer system, the transferable form of the developed software, and the version of the developed software represented by the transferable form of the software;
    receiving at the second computer system the transferable form of the developed software from the first computer system and the transferable form of the content used by the developed software from the content server, the transferable form of the content representing content from the content server that is consistent with the version of the developed software represented by the transferable form of the software; and
    translating the received software and content into usable forms of the developed software and content that may be used by the second computer system.

2. The method of claim 1 wherein the transferable form of the developed software and the transferable form of the developed content are created at substantially the same time.

3. The method of claim 1 wherein the received software is translated into the usable form of the developed software before the received content is translated into the usable form of the developed content.

4. The method of claim 1, further comprising establishing consistency at the content server between the content made accessible by the content server and the developed content transferred to the content server.

5. The method of claim 1, further comprising establishing consistency at the second computer system between the received software and previously received versions of the received software.

6. The method of claim 1 further comprising establishing consistency at the content server between the developed content and the developed software.

7. The method of claim 1, wherein receiving at the second computer system the transferable form of the developed content from the content server comprises:
    identifying content among the content made accessible by the content server and the developed content transferred to the content server that is relevant to the operation of the second computer system; and
    receiving only the identified content at the second computer system.

8. The method of claim 1, wherein creating a transferable form of the developed software comprises:
    identifying the developed software from software stored on the first computer system; and
    creating a transferable form of the identified software.

9. The method of claim 1, wherein creating a transferable form of the developed content comprises:

identifying the developed content from content stored on the first computer system; and creating a transferable form of the identified content.

10. The method of claim 1, wherein developing the software on the first computer system for use on the second computer system comprises testing the software on the first computer system for use on the second computer system.

11. A computer program product stored on a non-transient computer readable medium, the computer program product including instructions that, when executed, which perform operations comprising:

developing software on a first computer system for use on a second computer system, the second computer system being a client computer system;

developing content on the first computer system for use by the software;

creating a transferable form of the developed software that may be used by the second computer system;

creating a transferable form of the developed content that may be used by the second computer system, the transferable form of the content representing a version of the developed content that is consistent with a version of the developed software represented by the transferable form of the software;

making the transferable form of the developed software available for transfer to the second computer system;

transferring the transferable form of the developed content to a content server that makes a transferable form of content used by software running on the second computer system available for receipt by the second computer system, wherein a content consistency checking service verifies that the transferable form of the content does not conflict with content already stored on the content server and with at least one of software running on the second computer system, the transferable form of the developed software, and the version of the developed software represented by the transferable form of the software;

receiving at the second computer system the transferable form of the developed software from the first computer system and the transferable form of the content used by the developed software from the content server, the transferable form of the content representing content from the content server that is consistent with the version of the developed software represented by the transferable form of the software; and translating the received software and content into usable forms of the developed software and content that may be used by the second computer system.

12. The computer program product of claim 11 wherein the transferable form of the developed software and the transferable form of the developed content are created at substantially the same time.

13. The computer program product of claim 11 wherein the received software is translated into the usable form of the developed software before the received content is translated into the usable form of the developed content.

14. The computer program product of claim 11, wherein the instructions, when executed, further result in establishing consistency at the content server between the content made accessible by the content server and the developed content transferred to the content server.

15. The computer program product of claim 11, wherein the instructions, when executed, further result in establishing consistency at the second computer system between the received software and previously received versions of the received software.

16. The computer program product of claim 11, wherein the instructions, when executed, further result in establishing consistency at the content server between the developed content and the developed software.

17. The computer program product of claim 11, wherein receiving at the second computer system the transferable form of the developed content from the content server comprises:

identifying content among the content made accessible by the content server and the developed content transferred to the content server that is relevant to the operation of the second computer system; and receiving only the identified content at the second computer system.

18. The computer program product of claim 11, wherein creating a transferable form of the developed software comprises:

identifying the developed software from software stored on the first computer system; and creating a transferable form of the identified software.

19. The computer program product of claim 11, wherein creating a transferable form of the developed content comprises:

identifying the developed content from content stored on the first computer system; and creating a transferable form of the identified content.

20. The computer program product of claim 11, wherein developing the software on the first computer system for use on the second computer system comprises testing the software on the first computer system for use on the second computer system.

21. A system for transporting software with content that are used by the software, the system comprising:

a first computer system adapted for developing software and content that is used by the software;

a content server adapted for storing and distributing content used on multiple computer systems, including the content used by the software developed on the first computer system, to the multiple computer systems;

a second computer system adapted for executing the software developed on the first computer system and for using some or all of the content developed on the first computer system, wherein:

the second computer system is a client computer system the software executed by the second computer system is received from the first computer system, and the content that is used by the software executed by the second computer system is received from the content server; and wherein the content server comprises a consistency checking service adapted for establishing consistency between the content transferred to the content server and other content stored on the content server.

22. The system of claim 21 further comprising a process control adapted for controlling the transfer of the executed software from the first computer system to the second computer system and for controlling the transfer of the content used by the executed software from the first computer system to the second computer system through the content server.

23. The system of claim 21, wherein the first computer system comprises:

a software exporting service adapted for exporting the software developed on the first computer system for transfer to the second computer system; and a content exporting service adapted for exporting the content developed on the first computer system for transfer to the content server at substantially the same time as the software is exported.

24. The system of claim 21, wherein the second computer system comprises:

a software importing service adapted for importing the software transferred to the second computer system from the first computer system for execution on the second computer system; and a content importing service adapted for importing the content transferred to the second computer system from the content server for use by the software executed on the second computer system after the software is imported.

25. The system of claim 21, wherein the content server comprises:

a content importing service adapted for importing the content transferred to the content server for storage and distribution to the multiple computer systems; and a content exporting service adapted for exporting the content stored on the content server for distribution to the multiple computer systems.

26. The system of claim 21, wherein the content server comprises a content consolidation service adapted for identifying content used on each of the multiple computer systems.

* * * * *